F. W. KREMER.
APPARATUS FOR SATURATING FABRIC.
APPLICATION FILED MAY 16, 1914.
1,174,995.
Patented Mar. 14, 1916.
2 SHEETS—SHEET 1.
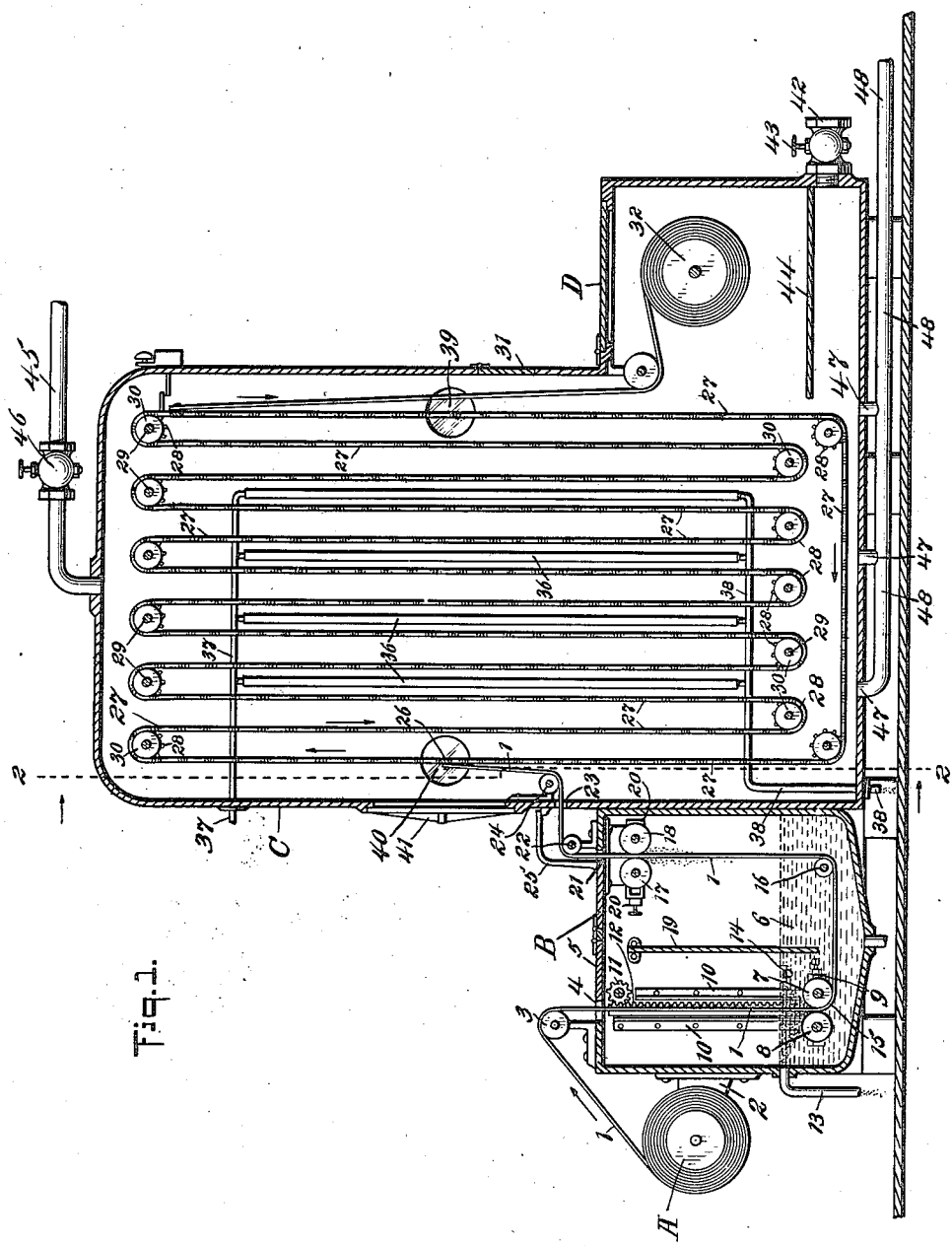
WITNESSES
INVENTOR
Franklin W. Kremer
BY
Moore & Clarke
ATTORNEYS

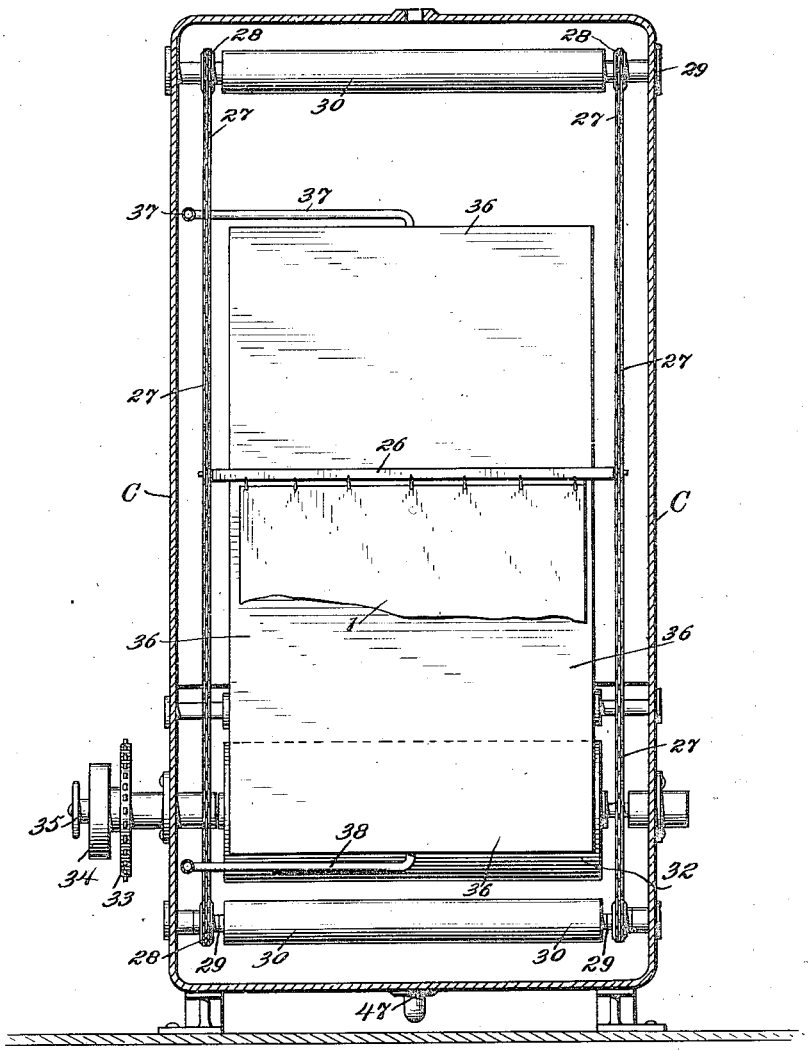

UNITED STATES PATENT OFFICE.

FRANKLIN W. KREMER, OF CARLSTADT, NEW JERSEY.

APPARATUS FOR SATURATING FABRIC.

1,174,995.   Specification of Letters Patent.   Patented Mar. 14, 1916.

Application filed May 16, 1914. Serial No. 839,135.

*To all whom it may concern:*

Be it known that I, FRANKLIN W. KREMER, citizen of the United States, and a resident of Carlstadt, in the county of Bergen and State of New Jersey, have invented certain new and useful Improvements in Apparatus for Saturating Fabric, of which the following is a specification.

This invention relates to a process and apparatus for saturating fabrics, and while the process and apparatus are particularly intended and adapted for saturating canvas or other fabric with rubber or other material to prepare the same for use in the manufacture of tire casings, it is obvious that the process and apparatus may be employed for saturating many other materials.

The problem in view is to saturate and coat canvas with rubber. This problem, so far as I am aware, has never heretofore been successively solved although those skilled in the art have worked diligently for many years to effect a solution. It has been heretofore proposed to feed the dry fabric through a bath consisting of rubber dissolved in a suitable solvent, the solution being known as rubber cement. After feeding fabric through the cement it was usually passed between squeezing rollers or other pressing means located above the surface of the rubber cement, the functions of the rollers being to press or squeeze the rubber into the fabric. This old process, I believe, is still used in lieu of a better one. The fibers of the fabric are not thoroughly saturated by the rubber but are merely coated therewith. And, moreover, a certain percentage of air is probably present at the time of the squeezing operation and this prevents even the coating of the fibers with rubber from being complete. It is found that canvas thus coated does not possess the maximum wearing qualities when in use in tire casings. The canvas fibers exert friction action on each other and break down or disintegrate. It has also been proposed to perform the operation of coating canvas with rubber in a vacuum chamber having the rubber cement solution in the lower portion thereof, the theory being that by exhausting the air from the chamber, the vacuum would draw out from the canvas any air remaining therein before the canvas passed down into the rubber solution, it being supposed that the rubber would then be sucked into the canvas to displace the vacuum. This vacuum process does not appear to operate successfully. The canvas is not thoroughly saturated and moreover the vacuum seems to act on the cement in such a manner that the solvent is gasified or otherwise drawn out of the rubber, thus thickening up the cement and interfering with good results.

As a result of many years' experience in this art and of numerous experiments and disappointments I have finally invented and devised a method and apparatus for thoroughly saturating fabrics in a simple and inexpensive manner.

My invention consists in feeding the dried fabric into the rubber solution or cement and in subjecting it, below the surface of the cement to such pressure as will squeeze out all the air remaining in the fabric, and in then releasing the fabric from this pressure while still submerged in the rubber solution so that the rubber is sucked thoroughly into all portions of the fibers of the canvas due to the expansion of the canvas after the release of the squeezing action. The canvas with the rubber thus sucked into the very core thereof, is then fed out of the rubber solution and passed through suitable pressing rollers, from which it is conducted into a drying chamber where it is properly dried, the fumes from the drying chamber resulting from the evaporation of the rubber solvent being suitably withdrawn and condensed for re-use. Of course, the temperature at this time must be kept below that of vulcanization. In squeezing out the air from the fabric, while under the surface of the liquid cement and in then permitting the fabric to expand and suck in the liquid, I preferably effect the expansion of the fabric in a portion of the liquid removed from the air bubbles produced by the squeezing action.

The invention as thus generally outlined may be carried out in many different ways as indicated by the variations in the scope of what is claimed without departing from the spirit of the invention.

In the accompanying drawings forming part of this specification: Figure 1 is a vertical section through a novel form of apparatus adapted for carrying out the process of the present invention. Fig. 2 is a vertical section on the line 2—2 of Fig. 1.

Like reference characters indicate corresponding parts in the different figures of the drawing.

In order to give a general outline of the entire machine, the reference letter A represents the reel of dried fabric which is to be saturated, B the saturating tank containing the rubber solution and the submerged squeezing rollers, C the drying chamber, and D the rewinding chamber in which the coated and saturated fabric is wound.

The reel A having the thoroughly dried fabric 1 wrapped thereon is suitably mounted on brackets 2 connected with the saturating chamber B. From the reel A the fabric 1 passes over an idle roller 3 and downward through a slot 4 formed in the upper end of the saturating tank B adjacent a suitable door 5. From the slot 4 the dried fabric passes vertically downward into the rubber solution or cement 6 and through a pair of squeezing rollers 7, 8, which are power driven to the same surface speed in a suitable manner. The rollers 7 and 8 are capable of being adjusted tightly toward each other in any one of the large number of different ways not necessary to be specifically illustrated herein. The squeezing rollers 7 and 8 preferably are journaled in any suitable manner in a roller-frame 9 which is mounted for vertical sliding movements between suitable tracks or guides 10 on the sides of the saturating tank. The roller-frame is raised by means of a pinion 11 meshing with a rack 12 which is connected with the roller-frame 9. By turning the pinion 11 through any suitable shaft the roller-frame and rollers may be lowered.

The squeezing rollers 7 and 8, which are soft material, such as rubber, are adjusted tightly enough together to squeeze out all of the air in the fabric. This air rises slowly through the cement in the form of bubbles and this bubble-filled portion of the cement may, if desired, be drawn off through the pipes 13 and 14, one arranged on each side of the fabric, and conducted by these pipes to any suitable settling tanks where the cement is freed from the air. The two squeezing rollers 7 and 8 preferably are arranged in the same horizontal plane and the fabric 1 passes vertically through between, whereby the fabric does not interfere with the air bubbles. The fabric with all the air squeezed therefrom emerges in a downward direction from the rollers as indicated at 15 and at this point the surrounding rubber is sucked or absorbed into the core of the fabric to take the place of the air which was expelled by the squeezing action. From the roller 7, the fabric passes along through the cement to a submerged idle roller 16 from which it passes upward to the squeezing rollers 17 and 18 mounted in the saturating tank above the surface of the cement. The rollers 17 and 18 are power driven at the same surface speed as the squeezing rollers 7 and 8 and they serve to squeeze the surplus rubber on the fabric back into the tank and also to press a part of such rubber into the fabric. I prefer to employ a baffle plate 19 which is mounted in the saturating tank and extends at its lower end a sufficient distance downward into the cement to prevent any of the bubble-laden portion of the cement from working over into contact with the fabric after it has been squeezed.

It is to be particularly noted that by having the fabric passed vertically downward into the solution, its direction of motion does not intersect the direction which the bubbles of air naturally take after being expelled from the fabric, to rise to the surface of the solution. Consequently none of the expelled air is again caught by the fabric and carried to the rollers 7 and 8 a second time; and since the air in the interstices of the fabric 1 therefore has to be expelled only once, the operation of the squeezing rollers 7 and 8 is very efficient. The fabric of course expands slightly as soon as it passes the rollers 7 and 8 and thus becomes more receptive to the solution and thereby subject to thorough impregnation.

The pair of squeezing rollers 17 and 18 are adjustable toward each other in any manner as indicated conventionally at 20. From the rollers 17 and 18 the fabric passes through a slot 21 and over an idle roller 22 through a slot 23 into a dry chamber C and around an idle roller 24. The idle roller 22 is protected and covered by means of a shield 25. After passing around the idle roller 24 the forward end of the fabric preferably is secured to a "come-along" 26, in the form of a bar shown in Figs. 1 and 2 extending transversely between parallel endless chains 27 mounted on suitable sprocket rollers and carried in a tortuous manner upward and downward through the drying chamber. One or more of the sprocket rollers for the endless chains 27 may be power driven at the same speed as the squeezing rollers. The sprocket rollers 28 are mounted on the ends of shafts 29 which carry the smooth rollers 30 around which the fabric passes in its movement through the drying chamber.

It will be obvious that the sprocket chains and the "come-along" carry the saturated fabric first upward and then downward and then upward, etc., until the front end of the fabric reaches a point adjacent the winding-up chamber D at which point an operative through the door 31 unhooks the end of the fabric from the "come-along" and guides it on to the winding roller 32. The winding roller 32 as shown in Fig. 2 is provided outside of the apparatus with a sprocket 33 which receives power through any suitable source. The sprocket 33 is connected up with the winding roller 32 by means of any suitable form of friction clutch 34 adapted to be tightened or adjusted by means of a hand wheel 35. The sprocket 33 through the friction clutch 34 winds the roller 32 at the proper speed and as the roll of fabric grows larger so that it needs to rotate slower in order to take up the slack of the fabric, the friction clutch permits the necessary slippage.

The fabric on its way through the drying chamber may be dried by the steam plates 36 arranged between the laps of the fabric and supplied with steam in any suitable manner as by means of the pipes 37, the water of condensation being withdrawn in any suitable manner as by means of the pipe 38. Suitable glass portholes 39 and 40 may be arranged in the sides of the drying chamber for the inspection of the same, and a suitable door 41 may be arranged in position to be open when attaching the fabric to the "come-along". If desired hot air may be supplied to the lower end of the drying chamber through the pipe 42 and valve 43. This hot air passes along under the baffle plate 44 and upward through the fabric. The hot air circulation may be maintained by suction on the upper pipe 45 provided with the valve 46. The heavy fumes of the benzol or other rubber solvent descend to the lower end of the drying chamber and are drawn out through the pipes 47 and conducted through the pipe 48 to a suitable condenser.

The operation of the process and apparatus is obvious from the foregoing description. The dried fabric is fed into the cement in such manner that the air is squeezed therefrom and the fabric expands at a point away from the escaping air so that it sucks in or absorbs the rubber solution. The fabric then passes out of the solution and the excess rubber is squeezed off or into the rubber and the fabric then passes into the drying chamber through which it is fed on to a winding-up roll. The operation may be made substantially continuous by sewing the front end of one piece of fabric to the rear end of the preceeding piece or the "come-along" may be arranged to sound an alarm bell in any suitable manner to notify the attendant that the piece of fabric is completely wound up.

The fabric saturated according to this process is so thoroughly impregnated with rubber that fiber friction is avoided and the fabric has a very long life in service. Samples of rubber coated fabric prepared by this process can be picked out readily from any number of samples prepared by the old process. The process can be used not only for saturating and coating fabrics for manufacturing tire casings but also for water-proofing fabrics, paper or other material.

The squeezing action by which the air is excluded from the fabric below the surface of the solution is absolutely positive and sufficient pressure can be brought to bear to exclude all air. The process is therefore in marked contrast to the uncertain action of a vacuum created above the surface of the liquid. The efficiency and simplicity of the present process and apparatus are obvious.

As any suitable means can be employed for driving the various rollers at the same surface speed, it has been deemed unnecessary to illustrate the same specifically herein. I usually prefer to apply the power to the submerged squeezing roller 7 which is geared up with the roller 8. The sprocket chains from the roller 7 serve to drive the rollers 17 and 18 and the drying rollers in the drying chamber C at the same surface speed.

What is claimed is:

1. The combination of a tank adapted to contain an impregnating fluid, a pair of squeezing rollers immersed in the fluid in said tank, means for permitting a fabric to be passed into said tank between said rollers, the direction of motion of said fabric being substantially parallel with the direction normally taken by air particles expelled from said fabric by said rollers, said tank having means for conducting air-laden fluid on one side of said fabric away in one direction, and air-laden fluid on the opposite side of said fabric away in another direction, means for causing said fabric to change its direction after passing said squeezing rollers, and means mounted in said tank and entering said fluid between the means for changing the direction of the fabric and the squeezing rollers for the purpose of confining the air bubbles expelled from said fabric to a portion of said fluid.

2. The combination of a tank adapted to contain an impregnating fluid, a pair of squeezing rollers immersed in the fluid in said tank, means for permitting a fabric to be passed into said tank between said rollers, the direction of motion of said fabric being substantially parallel with the direction normally taken by air particles expelled from said fabric by said rollers, said tank having means for conducting air-laden fluid on one side of said fabric away in one direction, and air-laden fluid on the opposite side of said fabric away in another direction, means for causing said fabric to change its direction after passing said squeezing rollers, and a pair of squeezing rollers above the surface of the fluid adapted to engage the fabric after it passes the aforesaid means for changing its direction to expel any surplus of the fluid therefrom before it is withdrawn from the tank.

3. The combination of a tank adapted to contain an impregnating fluid and a pair of squeezing rollers immersed therein, means for feeding a fabric vertically into the fluid to said squeezing rollers, said rollers acting to expel the air from said fabric, said tank having means for conducting air-laden fluid on one side of said fabric away in one direction, and air-laden fluid on the opposite side of said fabric away in another direction, a guide roller immersed in said fluid over which the fabric passes after leaving the squeezing rollers, said guide roller and said squeezing rollers being at substantially the same distance from the bottom of said tank, and a baffle plate mounted in said tank and extending below the level of said fluid to a point between the squeezing rollers and guide roller, said baffle plate serving to confine the air bubbles expelled from the fabric to a portion of the fluid adjacent the squeezing rollers.

4. The combination of a tank adapted to contain an impregnating fluid and a pair of squeezing rollers immersed therein, means for feeding a fabric vertically into the fluid to said squeezing rollers, said rollers acting to expel the air from said fabric, said tank having means for conducting air-laden fluid on one side of said fabric away in one direction, and air-laden fluid on the opposite side of said fabric away in another direction, a guide roller immersed in said fluid over which the fabric passes after leaving the squeezing rollers, said guide roller and said squeezing rollers being at substantially the same distance from the bottom of said tank, and a pair of squeezing rollers beyond the guide roller and above the surface of the fluid to expel the surplus fluid from said fabric before it is withdrawn from the tank.

5. Apparatus for impregnating tire fabric having in combination an immersion tank, squeezing rollers, means for adjusting said rollers to vary their pressure, a vertically sliding frame in which said rollers are journaled, a rack on said frame within the tank and a door above the said frame, whereby by turning the pinion the frame may be lifted with the rollers, out of the tank or may be adjusted up and down within said tank.

6. In a tire fabric impregnating apparatus, in combination, a tank, a bracket on the side of said tank adapted to sustain a drum, a bracket on top of said tank, an idle roller in said bracket, an opening in the top of said tank beneath the discharge side of said roller, a pair of squeezing rollers, adjustable toward and from each other beneath said opening, a guide roller to one side of said squeezing rollers, a second pair of squeezing rollers, above said guide roller, a baffle plate between the squeezing rollers, and means connected to the tank for drying the impregnated fabric.

7. The combination of a tank to contain a fluid to impregnate a fabric, means to be immersed in said fluid to expel gaseous particles from said fabric, means for conducting any fluid laden with such particles on one side of the fabric away therefrom in one direction, and means for conducting any fluid laden with such particles on the opposite side of the fabric away therefrom in another direction.

8. The combination of a tank to contain fluid to impregnate a fabric, means to be immersed in said fluid to expel gaseous particles from said fabric, means for passing the fabric into the tank to be acted upon by the expelling means, the direction of motion of the fabric being substantially parallel with the direction normally taken by such particles after expulsion from the fabric, and means for conducting any fluid laden with such particles on one side of the fabric away therefrom in one direction and fluid laden with such particles on the opposite side of said fabric away therefrom in another direction.

9. The combination of a tank to contain an impregnating fluid, a pair of squeezing rollers to be immersed in the fluid in said tank, means for permitting a fabric to be passed into the tank between said rollers, the direction of motion of said fabric being substantially parallel with the direction normally taken by gaseous particles expelled from said fabric by the rollers, said tank having means for conducting fluid containing such particles on one side of the fabric away therefrom in one direction and any fluid containing such particles on the opposite side of the fabric away therefrom in another direction.

10. The combination of a tank to contain an impregnating fluid, a pair of squeezing rollers to be immersed in the fluid, means for permitting a fabric to be passed into the tank between said rollers, the direction of motion of said fabric being substantially parallel with the direction normally taken by gaseous particles expelled from the fabric by said rollers, said tank having means for conducting fluid containing such particles on one side of the fabric away therefrom in one direction and fluid containing such particles on the opposite side of the fabric away therefrom in another direction, and means for confining the particles to a part of said fluid.

11. The combination of a tank to contain a fluid to impregnate a fabric, means to be immersed in the fluid in the tank to expel gaseous particles from the fabric, and means for conducting fluid containing such particles away from both sides of the fabric.

12. The combination of a tank to contain a fluid to impregnate a fabric, means to be immersed in the fluid in the tank to expel gaseous particles from the fabric, means for conducting fluid containing such particles after expulsion away from the fabric, and means for confining such expelled particles to a portion of the tank.

Signed at New York in the county of New York and State of New York this 8th day of January, A. D. 1914.

FRANKLIN W. KREMER.

Witness:
C. W. BRINDLEY.